United States Patent
Hansen et al.

(10) Patent No.: US 9,037,092 B2
(45) Date of Patent: May 19, 2015

(54) METHOD, APPARATUS AND COMPUTER PROGRAM FOR DETERMINING WHETHER A RECEIVED SIGNAL COMPRISES A FIRST SIGNAL COMPONENT

(71) Applicant: Broadcom Corporation, Irvine, CA (US)

(72) Inventors: Morten R. Hansen, Vanlose (DK); Lars P. B. Christensen, Charlottenlund (DK)

(73) Assignee: BROADCOM CORPORATION, Irvine, CA (US)

( * ) Notice: Subject to any disclaimer, the term of this patent is extended or adjusted under 35 U.S.C. 154(b) by 51 days.

(21) Appl. No.: 14/041,546

(22) Filed: Sep. 30, 2013

(65) Prior Publication Data

US 2015/0093997 A1     Apr. 2, 2015

(51) Int. Cl.
*H04B 17/00*     (2006.01)
*H04W 24/08*     (2009.01)

(52) U.S. Cl.
CPC ..................................... *H04W 24/08* (2013.01)

(58) Field of Classification Search
USPC .......... 455/67.11, 67.13, 67.16, 192.1, 192.2, 455/255, 256, 257, 258, 260, 265, 500, 455/502; 375/340, 341, 344, 356, 362, 365
See application file for complete search history.

(56) References Cited

U.S. PATENT DOCUMENTS

| | | | | |
|---|---|---|---|---|
| 5,970,102 | A * | 10/1999 | Hwang | 375/340 |
| 6,104,767 | A * | 8/2000 | Atarius et al. | 375/344 |
| 6,356,608 | B1 * | 3/2002 | Atarius | 375/362 |
| 6,480,555 | B1 * | 11/2002 | Renard et al. | 375/340 |
| 6,490,454 | B1 * | 12/2002 | Kangas et al. | 455/456.1 |
| 6,757,527 | B1 * | 6/2004 | Dahlback et al. | 455/255 |
| 6,879,823 | B1 * | 4/2005 | Raaf | 455/414.1 |

(Continued)

OTHER PUBLICATIONS

Low-Complexity Frequency Synchronization for GSM Systems: Algorithms and Implementation; Harald Kroll, Stefan Zwicky, Christian Benkeser, Qiuting Huang, Andreas Burg; IV International Congress on Ultra Modem Telecommunications and Control Systems 2012; pp. 168-173; 2012 (6 pages).

(Continued)

*Primary Examiner* — Tuan A Tran
(74) *Attorney, Agent, or Firm* — Oblon, McClelland, Maier & Neustadt, L.L.P.

(57) ABSTRACT

A method of determining at a receiver whether a received signal comprises a pure tone signal component. The method comprises: measuring a received signal over a measurement period; calculating, using maximum likelihood hypothesis testing, a likelihood ratio value for the measured signal and, determining, based on said likelihood ratio value, whether the measured signal comprises a pure tone signal component. The likelihood ratio value is a value indicative of the ratio of a likelihood $L_{FSC}$ that the measured signal comprises a pure tone signal component, and a likelihood $L_{noFSC}$ that the measured signal does not comprise the pure tone signal component.

20 Claims, 7 Drawing Sheets

(56) References Cited

U.S. PATENT DOCUMENTS

| | | | |
|---|---|---|---|
| 6,885,693 B1* | 4/2005 | Burton | 375/142 |
| 7,062,282 B2* | 6/2006 | Liu et al. | 455/502 |
| 7,627,068 B2* | 12/2009 | Sun et al. | 375/362 |
| 7,864,891 B2* | 1/2011 | Mondet et al. | 375/326 |
| 8,077,820 B2* | 12/2011 | Telukuntla et al. | 375/360 |
| 8,275,086 B2* | 9/2012 | Sun et al. | 375/362 |
| 2004/0014480 A1* | 1/2004 | Liu et al. | 455/502 |
| 2005/0129149 A1* | 6/2005 | Kuntz | 375/343 |
| 2006/0029163 A1* | 2/2006 | Yang et al. | 375/340 |
| 2009/0225918 A1* | 9/2009 | Telukuntla et al. | 375/360 |
| 2012/0027147 A1 | 2/2012 | Ray et al. | |
| 2012/0106982 A1* | 5/2012 | Wagner et al. | 398/208 |

OTHER PUBLICATIONS

Hypothesis Testing Using Maximum Likelihood; CSE291: Statistical Learning, lecture #13 by Prof. Charles Elkan, University of California, San Diego; Feb. 15, 2005 ((3 pages).

\* cited by examiner

METHOD, APPARATUS AND COMPUTER PROGRAM FOR DETERMINING WHETHER A RECEIVED SIGNAL COMPRISES A FIRST SIGNAL COMPONENT

TECHNICAL FIELD

The present invention relates to a method, apparatus and computer program for determining whether a received signal comprises a first signal component.

BACKGROUND

The following abbreviations are used in the present specification:
AWGN Additive White Gaussian Noise
FCB Frequency Correction Burst
FCCH Frequency Correction Channel
FSC First Signal Component
GMSK Gaussian Minimum Shift Keying
GSM Global System for Mobile Communications
LR Likelihood Ratio
LRV Likelihood Ratio Value
SNR Signal-to-Noise Ratio
TDMA Time Division Multiple Access
UE User Equipment In GSM (Global System for Mobile Communications) systems, before a wireless device can communicate with a base station, it must first synchronise its local oscillator with the local oscillator of the base station. To facilitate this synchronisation, base stations transmit regular signals known as Frequency Correction Bursts (FCBs).

GSM systems use TDMA (Time Division Multiple Access) channel access methods to divide a frequency channel (i.e. carrier) into a series of channels in the time domain, which can be used for different purposes. More specifically, a frequency channel is divided into a series of TDMA frames, which are in turn divided into a number of time slots. Each time slot is associated with a particular channel and contains data bits to be transmitted to one or more wireless receivers.

Frequency Correction Bursts (FCBs) are transmitted on the Frequency Correction Channel (FCCH), which is a shared downlink channel that can be monitored by any wireless devices in the vicinity of a base station transmitting on that channel. In GSM systems, the #0 timeslot of every 10th or 11th TDMA frame is usually allocated as a FCCH. Thus, depending on the GSM system, an FCB is transmitted by a base station either every 46.2 ms or every 50.8 ms. Each FCB comprises a series of 142 consecutive logical zeros as data bits.

GSM systems use GMSK (Gaussian Minimum Shift Keying) modulation to modulate data bits onto a carrier signal. A GMSK modulated signal can be represented as:

$$s(t)=A\cos(2\pi ft+\gamma(t))  \qquad \text{Eqn. 1}$$

where $\gamma(t)$ is the signal phase, f is the carrier frequency, A is the signal amplitude, and t is the time. The signal phase $\gamma(t)$ can be expressed as:

$$\gamma(t)=\gamma_0+\Sigma_k x_k \Gamma(t-k\cdot T_s) \qquad \text{Eqn. 2}$$

where $T_s$ is the symbol period and $x_k$ denotes the kth transmitted symbol which in general can have the values $\pm 1$. $\gamma_0$ is the initial phase and $\Gamma(t)$ is a function which, on a high level, comprises steps of $\pi/2$ per symbol, which are smoothed to achieve a narrow spectrum. It will be appreciated that the signal phase $\gamma(t)$ is dependent on the transmitted symbol $x_k$. For further details on GMSK modulation, a standard text book on the GSM system can be consulted, e.g. "*The GSM System for Mobile Communications*" by Michel Mouly and Marie-Bernadette Pautet published by Cell & Sys.

As noted above, an FCB comprises a series of 142 consecutive logical zeros as data bits. In other words the data bits of an FCB can be represented as the vector $\tilde{x}=[0, \ldots, 0]^T$. Each zero data bit is then mapped by the GMSK modulator to a symbol of +1. In other words, the transmitted symbols $x_k$ in an FCB can be represented as the vector $x=[1, \ldots, 1]^T$.

As the transmitted symbols $x_k$ in an FCB are all +1, it follows from Eqn. 2 that the phase of the modulated signal changes constantly during an FCB. This phase change can be expressed as a constant rotation of $\phi$ per symbol. The discretised version of $\gamma(t)$ can therefore be expressed as:

$$\gamma_k=\gamma_{k-1}+\phi \qquad \text{Eqn. 3}$$

where, in GSM systems, $\phi=\pi/2$, and where and $\gamma_{k-1}$ represents the phase of the signal for the previously transmitted symbol.

As will be appreciated, therefore, in GMSK modulation, as an FCB comprises a stream of consecutive logical zeros, a modulated FCB signal is a sinusoidal signal with a phase that changes at a constant rate of $\phi$ multiplied by the symbol rate. As the rate of change of the phase of the signal is constant, the frequency of the signal is also constant. Thus, a modulated FCB can be thought of as a sinusoidal signal with a constant frequency (or in other words, a pure tone signal). In the context of GSM, the frequency of the modulated signal is 67.7 kHz above the carrier frequency f.

A wireless device synchronises with a base station by first detecting one or more FCBs transmitted by that base station. This is known as frequency burst detection. The wireless device then uses the detected FCB(s) to synchronise with the base station by, for example, determining the difference between the frequency of its own local oscillator, and the frequency of the FCB. This can in turn be used to determine the frequency offset between the local oscillator of the wireless device and the local oscillator of the transmitting base station (due to the fact that the FCB is a known constant frequency above the carrier frequency).

In some cases, the time at which the FCB was received is also determined, and this information is used by the wireless device to synchronise its time slot boundaries with those of the base station.

There are many existing methods for detecting FCBs. One simple method is to apply a bandpass filter around the expected frequency of the FCB (i.e. carrier frequency+67.7 kHz). The power of the received signal before filtering is then compared to the power of the received signal after filtering. If the power is the same or similar, it is determined that an FCB has been received; whereas, if the power has been reduced significantly, it is assumed that no FCB has been received. Such a method is not useful, however, when there is a large frequency offset between the transmitting base station and the receiving wireless device, because the apparent frequency of a received FCB will be significantly shifted from the expected frequency and will be filtered out by the bandpass filter, leading to a determination that no FCB has been received.

The paper "*Low-complexity Frequency Synchronization for GSM Systems: Algorithms and Implementation*" by Harald Kroll, Stefan Zwicky, Christian Benkeser, Qiuting Huang and Andreas Burg, as published in "*IV International Congress on Ultra Modern Telecommunications and Control Systems* 2012", pages 168 to 173, describes two alternative methods.

In the first of these methods, the phase difference between consecutively received symbols is determined, and the variance of the phase differences is analysed. As explained above, the modulation of the data bits in an FCB gives rise to a constant phase rotation per data bit. In a noiseless system, the variance of the phase differences should therefore be zero. The variance is compared to a threshold value to determine whether it is likely that an FCB has been received. As will be appreciated, the reliability of this method would be reduced the lower the SNR level, because noise will cause the phase differences to vary.

The second of these methods utilises the fact that the FCBs are transmitted periodically, and can therefore give rise to a periodically repeating signal pattern. In this method, the autocorrelation of a received signal is determined, and if the autocorrelation exceeds a certain threshold, it is determined that an FCB has been detected. It will be appreciated that at least two frequency correction bursts need to be received by the wireless device before an FCB can be detected.

There is a need for wireless devices to detect FCBs transmitted by base stations rapidly and reliably, not least because, before a wireless device has detected an FCB from a base station, it will be unsynchronised with that base station and will therefore not be able to communicate with the base station. Also, there is a need to cut down the power consumption of wireless devices, and long FCB monitoring periods increase the power consumption of wireless devices.

Another reason that FCBs need to be detected reliably and quickly, which has emerged relatively recently, is that GSM carriers are beginning to be "refarmed" for use as 3G/LTE carriers. These "refarmed" 3G/LTE carriers may look similar to GSM carriers in a GSM cell search context, and a wireless device may therefore end up spending unnecessary time and power looking for FCBs on a refarmed 3G/LTE carrier, which, of course, will not be a valid GSM carrier for which GSM synchronisation is possible. Thus, a system is needed in which a wireless device can quickly determine whether a frequency correction burst has been received in order to rule out or continue the GSM synchronization procedure.

Ideally, the maximum time taken for an FCB to be detected by a wireless device should be the period between FCB transmissions (i.e. 46.2 ms or 50.8 ms, depending on the GSM system). However, for each of the methods of detecting FCBs discussed above, and indeed many others not mentioned, this period can often be longer. This is because received FCBs can be "missed" or the SNR may be too low for reliable FCB detection. There is therefore a need for a new method of detecting received FCBs, which is fast and reliable.

SUMMARY

In a first exemplary embodiment of the invention, there is provided a method of determining at a receiver whether a received signal comprises a pure tone signal component, the method comprising: measuring a received signal over a measurement period; calculating, using maximum likelihood hypothesis testing, a likelihood ratio value for the measured signal, said likelihood ratio value being indicative of the ratio of a likelihood $L_{FSC}$ that the measured signal comprises a pure tone signal component, and a likelihood $L_{noFSC}$ that the measured signal does not comprise the pure tone signal component; and, determining, based on said likelihood ratio value, whether the measured signal comprises the pure tone signal component.

In a second exemplary embodiment of the invention, there is provided a processing system for a receiver, the processing system being for determining whether a signal received by the receiver comprises a pure tone signal component, and being constructed and arranged to cause the receiver to: measure a received signal over a measurement period; calculate, using maximum likelihood hypothesis testing, a likelihood ratio value for the measured signal, said likelihood ratio value being indicative of the ratio of a likelihood $L_{FSC}$ that the measured signal comprises a pure tone signal component, and a likelihood $L_{noFSC}$ that the measured signal does not comprise the pure tone signal component; and, determine, based on said likelihood ratio value, whether the measured signal comprises the pure tone signal component.

The processing system may comprise at least one processor and at least one memory including computer program instructions, the at least one memory and the computer program instructions being configured, with the at least one processor, to cause the receiver at least to perform a method as described above.

In a third exemplary embodiment of the invention, there is provided a computer program for determining whether a signal received by a receiver comprises a pure tone signal component, and said computer program comprising instructions such that when the computer program is executed by a processing system of the receiver, the receiver is caused to: measure a received signal over a measurement period; calculate, using maximum likelihood hypothesis testing, a likelihood ratio value for the measured signal, said likelihood ratio value being indicative of the ratio of a likelihood $L_{FSC}$ that the measured signal comprises a pure tone signal component, and a likelihood $L_{noFSC}$ that the measured signal does not comprise the pure tone signal component; and, determine, based on said likelihood ratio value, whether the measured signal comprises the pure tone signal component.

There may be provided a non-transitory computer-readable storage medium storing a computer program as described above.

DETAILED DESCRIPTION

Figure 1:
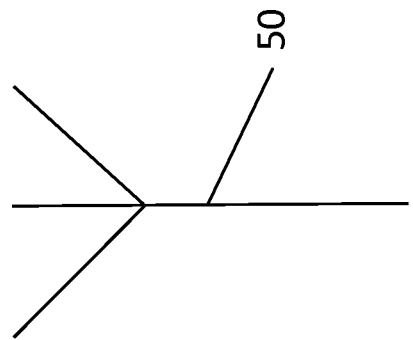
FIG. 1 shows schematically an example of an environment in which embodiments of the present invention can be practiced.
Figure 1:
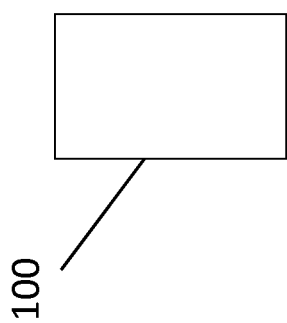

According to a first aspect of the present invention, there is provided method of determining at a receiver whether a received signal comprises a first signal component (FSC), said first signal component being a pure tone signal component, the method comprising: measuring a received signal over a measurement period; calculating, using maximum likelihood hypothesis testing, a likelihood ratio value for the measured signal, said likelihood ratio value being indicative of the ratio of a likelihood $L_{FSC}$ that the measured signal comprises a pure tone signal component, and a likelihood $L_{noFSC}$ that the measured signal does not comprise the pure tone signal component; and, determining, based on said likelihood ratio value, whether the measured signal comprises a first signal component.

In one embodiment, the first signal component is an encoded burst of data bits and substantially all the data bits have the same value, and in which the method comprises determining whether the measured signal comprises a said encoded burst of data bits. In such an embodiment, $L_{FSC}$ may be the likelihood that the measured signal comprises an encoded burst of data bits, and $L_{noFSC}$ may be the likelihood that the measured signal does not comprise an encoded burst of data bits.

In a particular embodiment, the first signal component may be a frequency correction burst and the method may comprise determining whether the measured signal comprises a frequency correction burst. As will become apparent in the following description, the present invention provides a method for determining whether a frequency correction burst has been received which is faster and more reliable that other techniques that are known in the art. As frequency correction bursts are used to achieve synchronisation between a transmitter and a receiver, it follows that the present invention provides a method which facilitates rapid synchronisation.

In general, the present invention provides a method for determining whether a first signal component has been received which is flexible, fast and reliable. This is because the method uses maximum likelihood hypothesis testing to determine whether it is likely that a measured signal comprises a first signal component. The hypotheses used to determine the likelihood ratio value can, in principle, be very accurate, because there is no requirement that the hypotheses make any assumptions or approximations. As an example, the likelihood $L_{FSC}$ can be determined according to a hypothesised model for a measured signal which comprises a pure tone signal component of a known or expected form, and the likelihood $L_{noFSC}$ can be determined according to a hypothesised model for a measured signal which does not comprise a pure tone signal component of that known or expected form.

The models can, in principle take into account any number of parameters, and thus can be very accurate. The models can also be adapted based on the expected form of the measured signal.

In particular, the model for the signal comprising a first signal component can account for factors such as the frequency offset between the receiver and the transmitter transmitting first signal components. This is particularly useful where the present method is used to detect frequency correction bursts, as the frequency offset between the transmitter and the receiver is typically unknown. Many prior art techniques for detecting frequency correction bursts, on the other hand, typically assume there is little or no frequency offset, and consequently perform badly at large frequency offsets.

The models can also take into account factors such as noise at the receiver, and in such arrangements, the present invention performs very well in conditions where the signal to noise ratio is low. This is in contrast to many known prior art techniques for detecting first signal components such as frequency correction bursts, which typically perform poorly at low signal to noise ratios, as discussed above.

In an embodiment, said step of determining whether the measured signal comprises a first signal component comprises comparing the likelihood ratio value to a threshold value. In a particular arrangement, the threshold value may depend on the receive dimension of the receiver and additionally, or alternatively, the number of symbols in the first signal component.

Advantageously, the method may be repeated for a plurality of measurement periods. In other words, a plurality of measurements of a received signal may be obtained, each measurement spanning a measurement period. This has the advantage that the probability of receiving a first signal component in a measurement period is increased.

In one arrangement, said received signal is received from a transmitter which is known to transmit first signal components in bursts at regular time intervals, and said plurality of measurement periods together span at least the time interval between two successively transmitted first signal component bursts. This has the advantage that a first signal component burst will be received in at least one of the measurement periods. An example of a first signal component which is transmitted in bursts at regular intervals may be a frequency correction burst.

The plurality of measurement periods may overlap in the time domain. In this case, said step of determining whether a measured signal comprises a first signal component comprises: comparing the calculated likelihood ratio value for each measured signal to a threshold value; identifying any measured signals for which the likelihood ratio value is above the threshold value; and comparing the likelihood ratio values for any identified measured signals whereby to establish in which measurement period a first signal component burst was most likely received.

As the measurement periods overlap in the time domain, it is likely that a first signal component burst, or part of a first signal component burst, will be received within a plurality of measurement periods. In other words, it is likely that a plurality of measured signals will comprise at least part of a first signal component burst. Any such measured signals can be identified by comparing the likelihood ratio values for the measured signals to a threshold value.

By then comparing the likelihood ratios for any identified measured signals, the signal which is most likely to comprise a first signal component burst, or which is most likely to comprise the largest part of a first signal component burst, can be identified.

This is particularly useful, because it allows the time at which a first signal component burst was received to be identified more accurately. This is in turn useful, for example, where the first signal component burst is used for synchronisation purposes, as the time at which the first signal component burst was received can be used to synchronise the time frames of the receiver with those of the transmitter.

In one embodiment, the method comprises determining the likelihood ratio value based on a model for a received signal comprising a pure tone signal component and a model for a received signal that does not comprise the pure tone signal component. As mentioned above, these models can, in principle, take into account any number of factors, and can therefore be very reliable.

In one particular arrangement, said model for a received signal comprising a first signal component may be based on a model for an encoded burst of data bits, wherein substantially all of said data bits have the same value.

In one arrangement, said model for a received signal comprising a pure tone signal component is dependent on the frequency offset between the transmitter that transmitted the received signal and said receiver. By taking the frequency offset into account, the present invention performs well across a large range of frequency offsets.

In one particular arrangement, said step of calculating the likelihood ratio value comprises estimating the frequency offset between the transmitter that transmitted the received signal and said receiver which will give the maximum value of $L_{FSC}$. The estimate for the frequency offset can be found by, for example, estimating the frequency of the received signal.

Advantageously, said model for a signal comprising a pure tone signal component may include a model for the likely noise in the signal. By taking the noise into account, the present invention performs reliably when the signal to noise ratio is low.

The noise may be modelled as Additive White Gaussian Noise. This may result in expressions for the likelihoods $L_{FSC}$ and $L_{noFSC}$ being simplified.

In one arrangement, the method comprises applying a pre-whitening operation to the measured signal before calculating the likelihood ratio value for the pre-whitened measured signal. This is useful where the noise in the received signal has been modelled as Additive White Gaussian Noise, but where the noise in the received signal is not actually Additive White Gaussian Noise. This is because the pre-whitening operation will remove any correlation in the noise, thereby increasing the accuracy of the models for the measured signal.

In one arrangement, said likelihood ratio value is: $L_{FSC}/L_{noFSC}$ or the logarithm of $L_{FSC}/L_{noFSC}$. The logarithm of $L_{FSC}/L_{noFSC}$ may be easier to compute than $L_{FSC}/L_{noFSC}$.

In one particular arrangement, wherein the receiver has a receive dimension of n and said received signal is received from a transmitter that is known to transmit first signal components comprising N encoded data bits, the likelihood ratio value is calculated according to either:

$$\max_{\hat{\theta}}\left(\frac{\hat{\sigma}_{MLFSC}(\hat{\theta})^2}{\hat{\sigma}_{AWGN}^2}\right)^{-N\cdot n} \quad \text{or} \quad \max_{\hat{\theta}} \ln\left(\frac{\hat{\sigma}_{MLFSC}(\hat{\theta})^2}{\hat{\sigma}_{AWGN}^2}\right)^{-N\cdot n}$$

$$\hat{\sigma}_{ML,FSC}(\hat{\theta})^2 \triangleq \frac{1}{N\cdot n}\left(\sum_{i=1}^{n} y_i^H y_i - \frac{1}{N} y_i^H f_i(\hat{\theta}) f_i(\hat{\theta})^H y_i\right),$$

and $$\hat{\sigma}_{AWGN}^2 \triangleq \frac{1}{N\cdot n} y^H y,$$

and wherein:

y is a vector comprising measurements of the received signal obtained over the measurement period;

$f_i(\theta) \triangleq [e^{j\rho_i}, e^{j(\theta+\rho_i)}, e^{j(2\theta+\rho_i)}, \ldots, e^{j((N-1)\theta+\rho_i)}]^T$;

$\rho_i$ is a parameter which accounts for any phase offset between receive dimensions of the receiver;

$\theta$ is a parameter which accounts for any phase rotation of the measured signal caused by modulation of the signal at the transmitter and any frequency offset between the transmitter and the receiver;

$\hat{\theta}$ is the estimated value of $\theta$; and, $$j \triangleq \sqrt[2]{-1}.$$

In one embodiment, said received signal is received from a transmitter which is known to transmit first signal components which are pure tone and which are modulated using Gaussian Minimum Shift Keying modulation before transmission, and the method comprises performing a phase rotation operation on said measured signal, prior to calculating the likelihood ratio value for the measured signal, whereby to remove any phase rotation caused by the Gaussian Minimum Shift Keying modulation. Alternatively, the rotation caused by the Gaussian Minimum Shift Keying modulation may be accounted for in a model for a signal comprising a first signal component.

In one arrangement, the method comprises applying a low pass filter, or a band pass filter, to the measured signal prior to calculating the likelihood ratio value for the measured signal.

In one arrangement, the method comprises performing a DC compensation operation on the measured signal, prior to calculating the likelihood ratio value for the measured signal, whereby to remove any DC components from the measured signal.

In one embodiment, the method is implemented within a GSM network.

"Wireless devices" include in general any device capable of connecting wirelessly to a network, and includes in particular mobile devices including mobile or cell phones (including so-called "smart phones"), personal digital assistants, pagers, tablet and laptop computers, wearable communication devices, content-consumption or generation devices (for music and/or video for example), data cards, USB dongles, devices for vehicles (for example connected cars) with wireless communication etc., as well as fixed or more static devices, such as personal computers, game consoles and other generally static entertainment devices, and various other domestic and non-domestic machines and devices, including for example consumer electronics and public safety devices, etc. The term "user equipment" or UE is often used to refer to wireless devices in general, and particularly mobile wireless devices.

The terms "transmitter" and "receiver" are used herein and are to be construed broadly to include the whole of a wireless device that is transmitting/receiving wireless signals as well as only particular components of a wireless device that are concerned with transmitting/receiving wireless signals or causing or leading to the transmission/reception of wireless signals.

Reference will sometimes be made in this specification to "base station". The term "base station" is used in this specification to include both a "traditional" base station, and any other access point to a network.

FIG. 1 shows schematically an exemplary environment in which embodiments of the present invention may be practiced. The environment comprises a transmitter 50, such as a base station, and in particular, a GSM base station. The transmitter 50 is configured to transmit FCBs at regular intervals to surrounding receivers, such as wireless receivers. One such receiver 100 is shown in FIG. 1.

Figure 2:
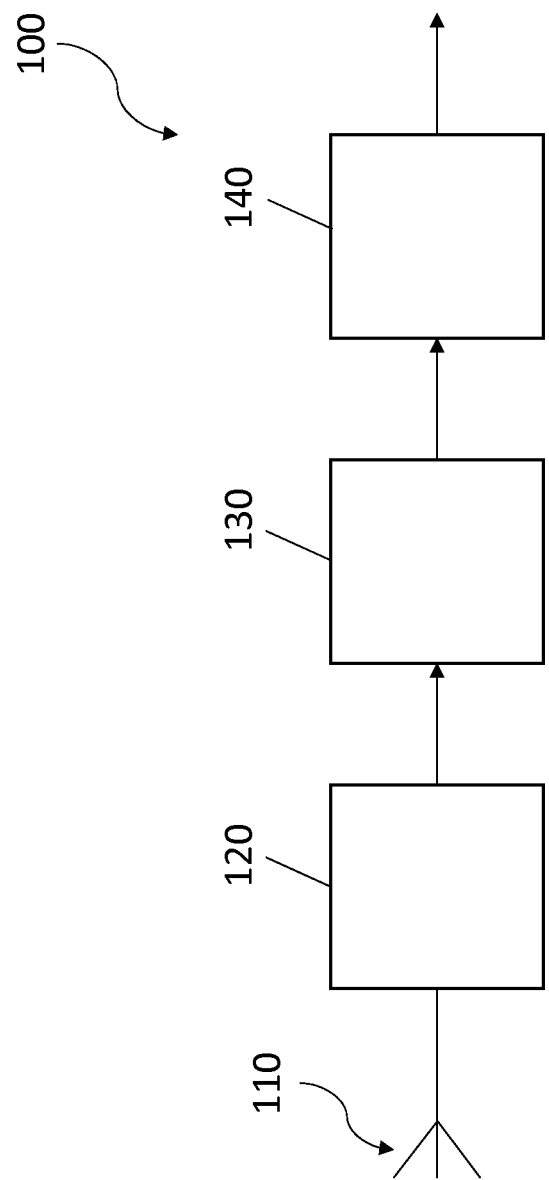
FIG. 2 shows schematically components of an exemplary receiver according to an embodiment of the present invention.

FIG. 2 shows schematically components of the receiver 100 according to an embodiment of the present invention. The receiver 100 comprises one or more antennas 110 for receiving wireless signals from wireless transmitters. The receiver 100 further comprises one or more signal measurement components 120, which take measurements of a received signal (or signals, if there are plural antennas) over one or more measurement periods. Such measurements could include, for example, the amplitude and phase of the received signal(s) at various time instances within the measurement period.

The receiver 100 also comprises a likelihood ratio (LR) calculator 130, which is configured to calculate, using maximum likelihood hypothesis testing, a likelihood ratio value (LRV) for a signal received within a particular measurement period (referred to hereinafter as a "measured" signal, and represented throughout as vector y). The LRV is a value indicative of the ratio of the likelihoods $L_{FCB}$ and $L_{noFCB}$, where $L_{FCB}$ is the likelihood that the measured signal comprises a frequency correction burst, and $L_{noFCB}$ is the likelihood that the measured signal does not comprise a frequency correction burst. It will be appreciated that the ratio $L_{FCB}/L_{noFCB}$ gives a measure for the likelihood that the measured signal comprises an FCB as compared to the likelihood that the measured signal does not comprise an FCB. Thus, the ratio $L_{FCB}/L_{noFCB}$ provides a useful measure for determining whether a signal received in a particular measurement period (i.e. whether a particular measured signal) comprises an FCB or not.

Maximum likelihood hypothesis testing is a known mathematical technique, in which a set of measurements of a system are "tested" against a model for the system, having unknown parameters, to determine an expression for the likelihood of having obtained the set of measurements given the assumption that the system conforms to the system model. This expression is then typically maximised to find the most likely parameters of the system. In one embodiment, maximum likelihood hypothesis testing may be used to calculate the likelihoods $L_{FCB}$ and $L_{noFCB}$. In particular, expressions for $L_{FCB}$ and $L_{noFCB}$ may be determined by "testing" a measured signal against the respective hypotheses that the measured signal does, and does not, comprise an FCB. These expressions may then be maximised.

In one embodiment, the likelihood $L_{FCB}$ is determined based on a model for a signal comprising a frequency correction burst (referred to hereinafter as the FCB model). One such FCB model is described in detail further below. In general terms, however, as FCBs are signals with a constant frequency above the carrier frequency, an exemplary FCB model could, for example, be a mathematical representation of a signal with constant frequency.

In GSM, the FCB signal is 67.7 kHz above the carrier frequency. However, as there may be a frequency offset between the local oscillator of the transmitter 50 that transmitted the FCB and the local oscillator of the receiver 100, the apparent frequency of the FCB, as measured by the receiver 100, could be different from the actual frequency of the signal. This frequency offset will be unknown before the receiver synchronises with the transmitter.

Advantageously, in one embodiment, any frequency offset is accounted for in the FCB model. This has the advantage that an accurate model for a signal comprising an FCB can be determined for all frequency offsets, and thus FCB detection can be performed reliably, irrespective of the frequency offset of the receiver 100. As described in the background section, many prior art methods for detecting FCBs assume that there is no frequency offset between the receiver 100 and the transmitter 50 (or assume that the frequency offset is small, so can be ignored). However, the frequency offset between the transmitter 50 and the receiver 100 can, in reality, be as much as e.g. 30 kHz, and these methods do not perform reliably with such large frequency offsets.

Other factors that may, in some arrangements, be accounted for in the FCB model include, for example, the noise at the receiver, and the effect of scattering, fading and power decay on the propagating signal. By taking account of noise in particular, it is possible to increase the reliability of the FCB detection at low SNR levels. As mentioned above in the background section, many existing methods for detecting FCBs do not take into account the effects of noise on the received signal, and thus do not perform well at low SNR levels.

As mentioned above, the likelihood $L_{FCB}$ is determined using maximum likelihood hypothesis testing. In one embodiment, the likelihood $L_{FCB}$ is determined by "testing" the FCB model against a measured signal y to determine an expression for the likelihood that the measured signal y comprises an FCB, given than the measurement y has been obtained. This expression may then be maximised with respect to any unknown model parameters to give $L_{FCB}$.

An expression for the likelihood $L_{noFCB}$ that a measured signal does not comprise an FCB can similarly be determined based on a model for a measured signal that does not comprise an FCB (referred to herein as the noFCB model). Again, one such model for a measured signal that does not comprise an FCB is described in detail further below.

In one embodiment, the likelihood $L_{noFCB}$ is determined using maximum likelihood hypothesis testing by testing the noFCB model against the same measured signal as was tested against the FCB model, whereby to determine an expression for the likelihood that the measured signal does not comprise an FCB, given than the measurement y has been obtained. This expression may then be maximised with respect to any unknown model parameters to give $L_{noFCB}$.

The expressions for $L_{FCB}$ and $L_{noFCB}$ may be maximised in a number of ways. As one example, the expressions could be maximised using differentiation. As another example, the LRV calculator 130 may be configured to estimate the values of any unknown parameters for which the expressions for $L_{FCB}$ and $L_{noFCB}$ will be maximised (or will be close to the maximal value). Such a method is useful if the expressions for $L_{FCB}$ and $L_{noFCB}$ are complex and are difficult to maximise using e.g. differentiation, as it can help reduce the complexity and amount of time required to determine an LRV for a measured signal.

In one embodiment of the invention, the LRV calculated by the LR calculator 130 is the ratio $L_{FSB}/L_{noFCB}$. In another embodiment, the LRV calculated by the LR calculator 130 is a different value, which is nevertheless indicative of the value of the ratio $L_{FCB}/L_{noFCB}$. Such a value could be, for example, $\ln(L_{FCB}/L_{noFCB})$ where ln (•) is the (natural) logarithm function.

It will be appreciated that the likelihoods $L_{FCB}$ and $L_{noFCB}$ need not be individually calculated or determined by the LR calculator 130 each time an LRV is calculated, but rather the LR calculator 130 may be pre-configured with an expression for the LRV, as a function of a measured signal, which it may use to calculate the LRV. Exemplary expressions with which the LR calculator 130 may be configured are given below in Equations 20 and 21. Upon receiving measurements of a received signal from the signal measurement components 120, the LR calculator 130 may, in this arrangement, be configured to input the received measurements into the LRV expression whereby to determine the LRV.

The receiver 100 further comprises an FCB detector 140 which is configured to receive the LRV calculated by the LR calculator 130, and to determine, based upon this value, whether the measured signal is likely to comprise a frequency correction burst. The FCB detector 140 may, for example, compare the LRV to a predetermined threshold value whereby to determine whether the measured signal is likely to comprise a frequency correction burst. If it is determined that the measured signal is likely to comprise an FCB, the FCB detector 140 may also identify the times during which the signal was measured, and therefore the times during which the FCB was received. This can be useful, for example, in enabling the receiver 100 to synchronise its time frames with the time frames of the transmitter 50 that transmitted the FCB.

In use, therefore, the receiver 100 receives a signal from a transmitter 50 via the antenna 110, and this signal is measured over a measurement period. The measurements are passed to the LR calculator 130, and the LR calculator uses the measurements to calculate an LRV for the measured signal. The LRV is then passed to the FCB detector 140 where it is determined, based upon the calculated LRV, whether it is likely that the measured signal comprises an FCB.

It will be appreciated that the receiver 100 may have additional components to the ones shown in FIG. 2, and additionally or alternatively, each of the components shown in FIG. 2 may themselves comprise a plurality of separate components. It will further be appreciated that each of the components may be provided by one or more processors or processing systems, which are configured to perform certain tasks as described herein.

The present invention provides a method for determining whether it is likely that an FCB has been received which is very flexible. In particular, the likelihoods $L_{FCB}$ and $L_{noFCB}$ can be determined based on models which take into account any number of factors. The likelihoods $L_{FCB}$ and $L_{noFCB}$ can therefore, in principle, be determined very accurately. Indeed, models can be used to calculate the likelihoods $L_{FCB}$ and $L_{noFCB}$ which require no approximations to be made as to the form of a measured signal. In this case, the LRV would provide a highly reliable measure for determining whether it is likely that an FCB has been received within a particular measurement period.

Figure 3:
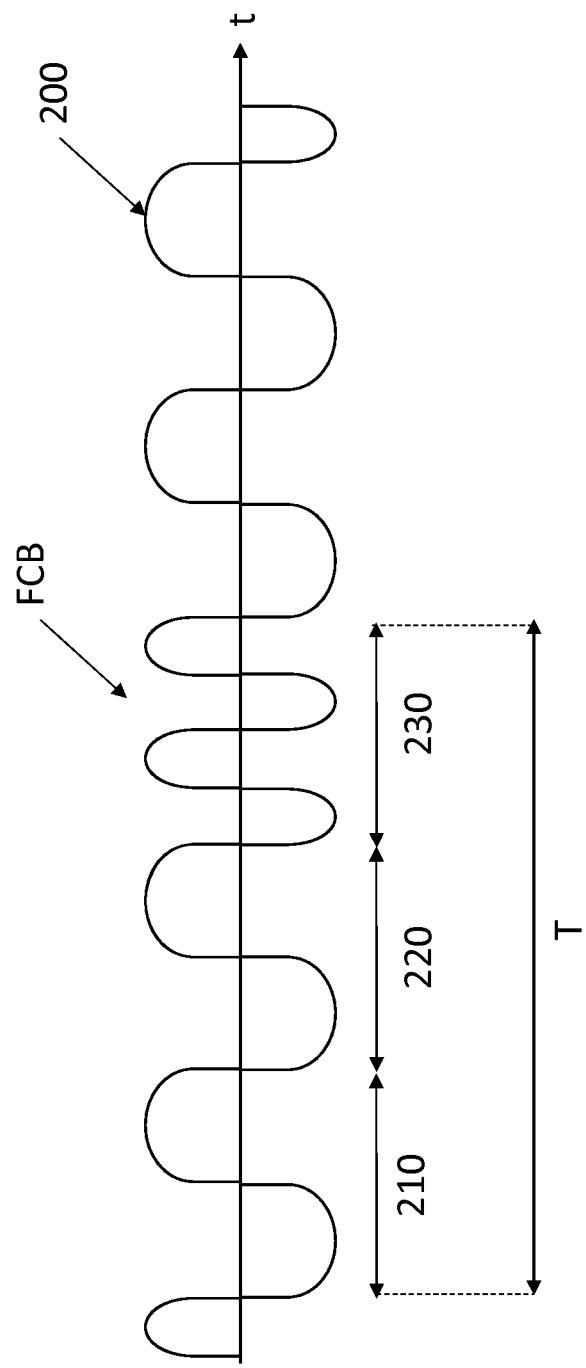
FIG. 3 shows schematically an example of a set of measurement periods according to an embodiment of the present invention.

In one exemplary arrangement, the receiver 100 may be configured to obtain measurements of a received signal over a plurality of measurement periods, as shown schematically in FIG. 3. FIG. 3 shows a received signal 200, and three exemplary measurement periods 210, 220, 230, which are adjacent to one another and span a total measurement period of length T. The LR calculator 130 may be configured to determine an LRV for measurements of a signal obtained in each of these periods 210, 220, 230.

Advantageously, the total measurement period T could be equal to or longer than the period with which FCBs are transmitted by the transmitter 50. In this case, it can be guaranteed that at least one FCB will have been received from the transmitter 50 within the total measurement period T. As mentioned above in the background section, in GSM systems, FCBs are transmitted every 46.2 ms or every 50.8 ms. Thus, the total measurement period T could be, for example, 46.2 ms, 50.8 ms, or longer. In FIG. 3, the total measurement period T is equal to the period with which FCBs are transmitted (the FCBs being the higher-frequency components in the signal 200).

In one arrangement, when multiple LRVs are calculated for multiple measurement periods, the FCB detector 140 could be configured to compare each of the LRVs to a threshold value to identify any measured periods in which it is likely that an FCB was received (i.e. to identify measured signals that may comprise FCBs). The FCB detector 140 may then be configured to compare the LRVs for the identified measurement periods and to identify the LRV that indicates the highest likelihood that an FCB was received in the associated measurement period. This is useful, for example, in the event that a received FCB spans two (or more) sampling periods, because it enables the sampling period in which the FCB was "mostly" received to be identified (and therefore allows the measured signal which is "mostly" an FCB to be identified).

Figure 4:
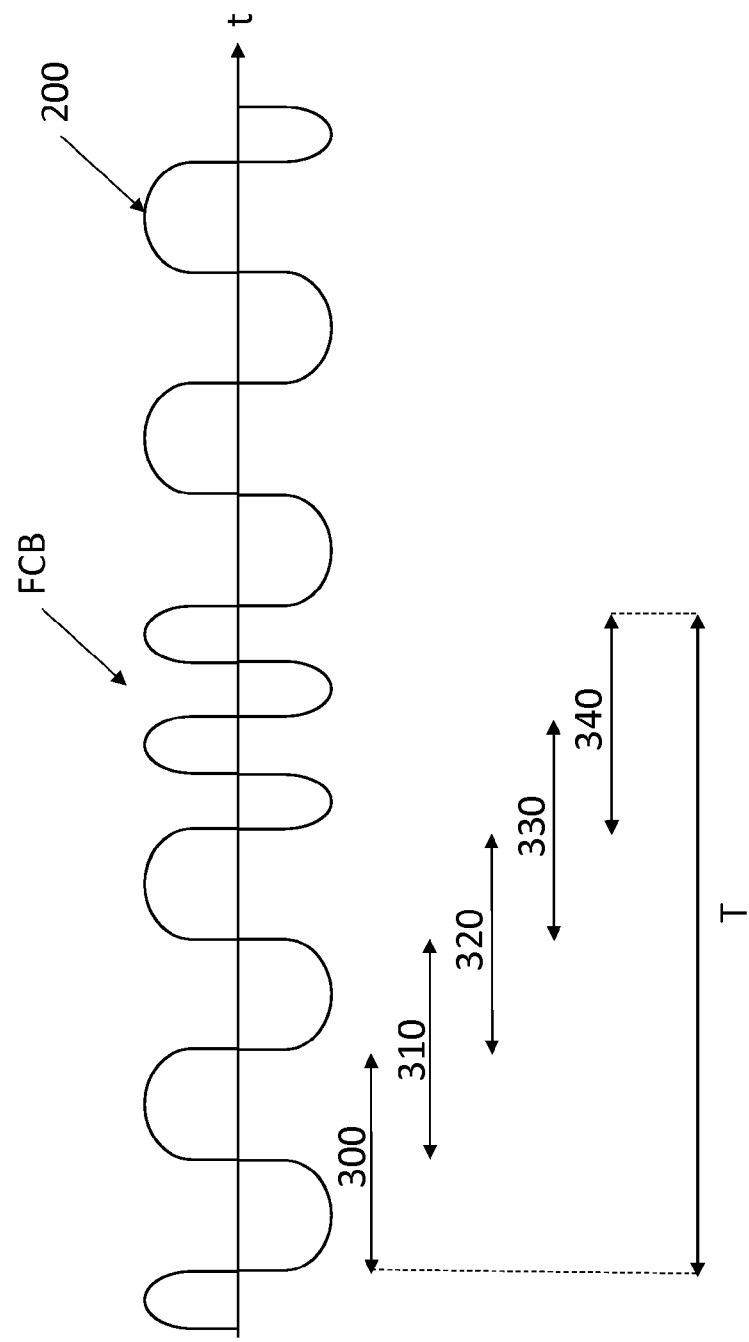
FIG. 4 shows schematically an example of another set of measurement periods according to an embodiment of the present invention.

In one arrangement, as illustrated schematically in FIG. 4, the measurement periods 300, 310, 320, 330, 340 may overlap. Again, as described above, the LR calculator 130 may calculate an LRV for signals measured in each of these periods 300, 310, 320, 330, 340. Again, the LRV values may be compared to a threshold value by the FCB detector 140 to identify any measurement periods 300, 310, 320, 330, 340 in which it is likely that an FCB was received (and thereby identify any measured signals which are likely to comprise an FCB).

Additionally, the LRVs for any identified measurement periods 300, 310, 320, 330, 340 may be compared to identify the measurement period 300, 310, 320, 330, 340 that is likely to mostly, or wholly, contain the received FCB. In the example shown in FIG. 4, the signals measured in measurement periods 330 and 340 comprise an FCB. These periods 330, 340 would therefore most likely be identified by the FCB detector 140. Upon comparison of the LRVs for the two identified periods, the FCB detector 140 would most likely determine that the FCB was mostly received in measurement period 340 (because the signal received in period 340 is wholly FCB, whereas the signal received in period 330 is only partly FCB). By overlapping the measurement periods, the time at which an FCB was received can be determined more accurately. This is useful were FCBs are used for time frame synchronisation, for example.

As a specific example, the signal measurement components 120 are configured to take 142 samples of a received signal within a first measurement period, as denoted by $[r_1, r_2, r_3, \ldots r_{142}]$. In one arrangement, the next consecutive measurement period may overlap the first measurements period by e.g. between 126 samples to 138 samples (i.e. the next measurement period may comprise e.g. samples $[r_5, r_6, r_7, \ldots r_{146}]$, or $[r_{17}, r_{18}, r_{19}, \ldots r_{158}]$). In this case, therefore, it is possible to determine the start of an FCB to within 4 to 16 samples. In such a case, the signal measurement components 120 may continuously sample a received signal, and may send all of the samples to the LRV calculator 130. The LRV calculator 130 may then select the samples which are to form the basis of an LRV calculation for a given measurement period.

The functionality of the LR calculator 130 according to one exemplary embodiment of the invention will be described hereinafter in more detail. As discussed above, the LR calculator 130 is configured to calculate an LRV for a measured signal. The LRV is a value indicative of the ratio of the likelihood $L_{FCB}$ that the measured signal comprises a frequency correction burst, and the likelihood $L_{noFCB}$ that the measured signal does not comprise a frequency correction burst. In this embodiment, the likelihoods $L_{FCB}$ and $L_{noFCB}$ are determined using maximum likelihood hypothesis testing. As described above in general terms, the likelihood $L_{FCB}$ may be determined based on a model for a measured signal comprising an FCB (i.e. the "FCB model"), and the likelihood $L_{noFCB}$ may be determined based on a model for a measured signal that does not comprise an FCB (i.e. the "noFCB model").

An exemplary FCB model for a measured signal y, which can be used for the calculation of the likelihood $L_{FCB}$, will be described below. The FCB model assumes GMSK modulation is used by the transmitter 50 transmitting the FCBs, and that each FCB comprises a series of N logical zeros as data bits (in GSM systems, N=142). The FCB model also assumes that the receiver 100 is configured to obtain M samples of a received signal at a rate R within a measurement period of length t, which is equal to the length of an FCB. The actual measured signal y could therefore be represented as a vector with M components, each component giving the measured amplitude and phase of a received signal at a sample time within the measurement period t. It follows therefore that the FCB model for the measured signal y can also be represented as a vector with M components.

'M', in this model, is nN, where 'N' is the total number of data bits in an FCB (i.e. 142 in GSM systems), and 'n' is a factor which accounts for any oversampling and/or receive diversity at the receiver 100. Thus, for example, if a receiver were to sample a received signal at a rate R of twice the bit rate of the transmitter 50 that transmitted the signal, the receive dimension n would be two. If the receiver were also receiving the signal via e.g. two antennas, the receive dimension would be n=2×2=4.

Figure 5:
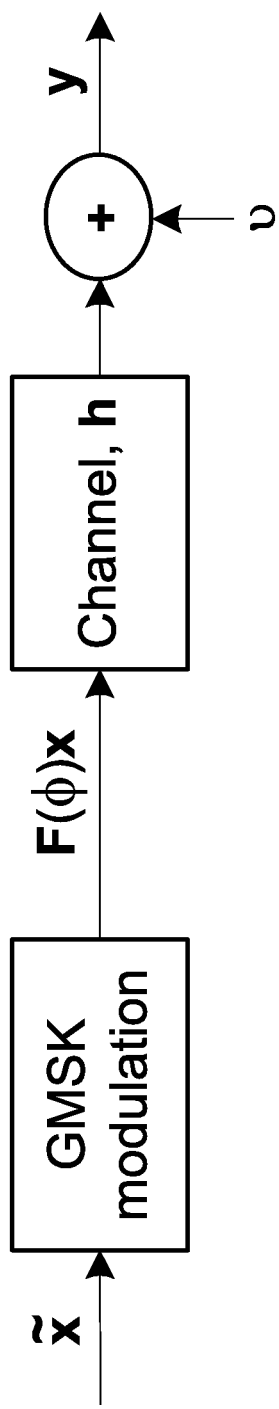
FIG. 5 shows schematically a number of factors which can affect the form of a frequency correction burst.

As mentioned above, an FCB begins at the transmitter 50 as a series of N data bits of zero value. In order to come up with an FCB model for the measured signal y, it is useful to first consider how the form of the FCB may change between transmission and reception. FIG. 5 shows schematically some factors that may affect the form of an FCB. In FIG. 5, the vector $\tilde{x}$ represents the stream of N FCB data bits before transmission (i.e. $\tilde{x}=[0, \ldots, 0]^T$).

At the transmitter 50, the FCB data bits are first mapped to symbols and modulated onto a carrier signal using GMSK modulation. The data bits are mapped to symbols such that 0→1. Thus, the transmitted symbols can be represented as $x=[1, \ldots, 1]^T$. The operation of the modulator on the transmitted symbols x is represented by the operator $F(\phi)$, and thus the output of the modulator can be represented as $F(\phi)x$.

The modulated FCB symbols are then transmitted by the transmitter 50. As the signal propagates, it may be subject to factors such as scattering, fading and power decay, which will depend on the channel conditions at the time of propagation. The effect on the signal can be represented by the channel vector h (which will be discussed in more detail below).

Finally, when the signal reaches the receiver 100, the receiver will detect the signal; however, it will also pick up noise $\upsilon$ from its surroundings. Thus, the measured signal y can be considered as the transmitted symbols x, as modified by the factors $F(\phi)$, h and $\upsilon$.

Considering first the GMSK modulator operator $F(\phi)$, as discussed above in the background section, in GMSK modulation, two consecutive logical zeros result in a fixed phase change to the carrier signal of $\phi$. The operation performed by the GMSK encoder is in effect therefore a phase rotation, and can be represented by a rotation matrix. Thus, the operation of the GMSK modulator, in response to an input FCB, can be expressed as:

$$F_N(\phi) \triangleq \text{diag}(1, e^{j\phi}, e^{j2\phi}, \ldots, e^{j(N-1)\phi}) \quad \text{Eqn. 4}$$

where diag(•) represents a matrix having non-diagonal elements of zero, and diagonal elements as given in the brackets. Throughout this description, 'j' has its standard definition of $$j \triangleq \sqrt{-1}.$$

The transmitted signal can, therefore, be represented as $F_N(\phi)x$ as explained above, with reference to FIG. 5. The index N has been introduced to clearly indicate the dimensionality of $F(\phi)$.

As discussed in the background section, however, there can be an offset between the frequency of the local oscillator of the receiver 100 as compared to the local oscillator of the transmitter 50. Thus, although the transmitter may transmit FCB symbols with a certain rate and therefore, equivalently, a certain frequency above the carrier frequency, an FCB may appear to the receiver 100 to have a different frequency. This frequency shift can be represented by another rotation matrix much the same as the rotation matrix given in Eqn. 4 (except that $\phi$ would be replaced by a different angle $\psi$ representing the rotation due to the frequency offset).

The combined rotation due to the GMSK modulator and the frequency offset could therefore be written as:

$$F_N(\theta) = F_N \phi F_N(\psi) \quad \text{Eqn. 5}$$

Given that $F_N(\phi)$ and $F_N(\psi)$ have the same form, it follows from Eqn. 4 above that $F_N(\phi)F_N(\psi)=F_N(\phi+\psi)$, and therefore that $\theta=\phi+\psi$ and $F_N(\theta)$ can be written as:

$$F_N(\theta) \triangleq \text{diag}(1, e^{j\theta}, e^{j2\theta}, \ldots, e^{j(N-1)\theta}) \quad \text{Eqn. 6}$$

Another factor that can be considered when determining a model for y is the receive dimension n of the receiver 100. As mentioned above, a receiver 100 may sample at a rate higher than the rate at which the transmitter 50 is transmitting FCB data bits. Additionally, or alternatively, the receiver 100 may receive signals on a plurality of antennas. Thus, for a given sample period, the number of samples obtained by the receiver 100 may be greater than the number N of symbols in an FCB.

The operator $F(\theta)$ can, in this case, be represented as follows:

$$F_M(\theta) = \text{diag}(f_1(\theta)^T, \ldots, f_n(\theta)^T) \quad \text{Eqn. 7}$$

where $f_i(\theta)$ is a vector with N components, and there is one vector $f_i(\theta)$ (and therefore one set of diagonal elements $f_i(\theta)^T$) for each receive dimension. $f_i(\theta)^T$ is the vector transpose and is defined as:

$$f_i(\theta)^T \triangleq [e^{j\rho_i}, e^{j(\theta+\rho_i)}, e^{j(2\theta+\rho_i)}, \ldots, e^{j((N-1)\theta+\rho_i)}] \quad \text{Eqn. 8}$$

where $\rho_i$ has been introduced to account for any phase offset between the different receive dimensions. As an example, if the receiver 100 oversamples by a factor of 2, $\rho_1$ would be zero, and $\rho_2$ would be $\theta/2$. In short, the operator $F_M(\theta)$ is an M-dimensional rotation matrix, with only diagonal elements.

Turning back to the FCB model for the measured signal y and bringing together all of the factors $F(\theta)$, h and $\upsilon$ discussed above, a model for the measured signal y comprising an FCB can be expressed as:

$$y = \begin{bmatrix} y_1 \\ \vdots \\ y_n \end{bmatrix} = F_M(\theta)Xh + \upsilon \quad \text{Eqn. 9}$$

The FCB model for y has been expressed using a complex-valued system model, and the components have been ordered according to the receive dimension. Thus, if, for example the receiver 100 oversamples by a factor of two, the first, third, fifth etc. samples would be in sub-vector $y_1$ and the second, fourth, sixth etc. samples would be in sub-vector $y_2$.

X is a matrix representing the transmitted symbols and the convolution operation between the transmitted symbols and the channel impulse response. The channel impulse response accounts for the fact that a symbol will, in practice, take a certain length time to be received due to e.g. scattering of the transmitted signal. Thus, whilst a symbol may be transmitted at some time t as the symbol '1', a receiver may receive a series of '1's corresponding to the same transmitted symbol. These '1's may have taken paths of different lengths between the transmitter and the receiver causing them to be received at different times.

Accounting for oversampling and/or receive diversity, X is an nN×nL matrix, where L is the length of the channel impulse response per receive dimension. As the data bits, $\tilde{x}_k$, in an FCB are all zeros, which are then mapped such that the symbols $x_k$ are all '1's, the matrix X can be expressed as follows:

$$X = \begin{bmatrix} 1_{N \times L} & 0_{N \times L} & \cdots & 0_{N \times L} \\ 0_{N \times L} & 1_{N \times L} & \ddots & \vdots \\ \vdots & \ddots & \ddots & 0_{N \times L} \\ 0_{N \times L} & \cdots & 0_{N \times L} & 1_{N \times L} \end{bmatrix} \quad \text{Eqn. 10}$$

where $1_{N \times L}$ is an N×L sub-matrix comprising all 1's, and $0_{N \times L}$ is an N×L sub-matrix comprising all '0's. As will be readily apparent, as X is an nN×nL matrix, there are n rows and n columns of these N×L sub-matrices, in the matrix X (where n is the receive dimension, as defined above). Thus, if the receive dimension of the receiver is n=1, the matrix X is a N×L matrix comprising all '1's.

In general, the channel vector h, which is defined as $h \triangleq [h_1, h_2, h_n]^T$, where each sub-vector $h_i$ has L components, would be convolved with the transmitted symbols x. However, since the FCB data bits are all zeros, the vector collapses to n scalar elements $\tilde{h}_i$ as shown in Eqn. 11.

Putting all this together, an FCB model for the measured signal y can be expressed as:

$$\begin{aligned} y &= F_M(\theta)Xh + \upsilon \quad \text{Eqn. 11}\\ &= F_M(\theta)\begin{bmatrix} 1_{N \times 1} 1_{L \times 1}^H h_1 \\ \vdots \\ 1_{N \times 1} 1_{L \times 1}^H h_n \end{bmatrix} + \upsilon \\ &= F_M(\theta)\begin{bmatrix} 1_{N \times 1} \tilde{h}_1 \\ \vdots \\ 1_{N \times 1} \tilde{h}_n \end{bmatrix} + \upsilon \\ &= \begin{bmatrix} f_1(\theta)\tilde{h}_1 \\ \vdots \\ f_n(\theta)\tilde{h}_n \end{bmatrix} + \upsilon \end{aligned}$$

where $\tilde{h}_i \triangleq 1_{L \times 1}^H h_i$ is the sum of the components of $h_i$, $1_{L \times 1}^H$, is the Hermitian conjugate of a vector with L components of value 1, and $1_{N \times 1}$ is a vector with N components of value 1. Eqn. 11 therefore gives an expression for a model of a measured signal comprising an FCB.

Having found an expression for a model of a measured signal comprising an FCB, it is now possible to find an expression for $L_{FCB}$. In the present embodiment, $L_{FCB}$ is found using maximum likelihood hypothesis testing by maximizing an expression for the likelihood that the measured signal comprises an FCB, given that a particular measurement y has been obtained.

Maximum likelihood hypothesis testing is a known mathematical technique, in which a set of measurements of a system are "tested" against a model for the system, having unknown parameters, to determine an expression for the likelihood of having obtained the set of measurements given the assumption that the system conforms to the system model. This expression is then maximised (typically to find the most likely parameters of the system model).

Thus, in this embodiment, an expression for $L_{FCB}$ is given by the maximum likelihood that the measured signal is of the form as given in Equation 11 given that the measurement y has been obtained, given the assumption that the measured signal is of the form as given in Equation 11.

As mentioned above, the actual measured signal y comprises a set of nN measurements $[y_1, y_2, \ldots y_{nN}]$ of the amplitude and phase of a received signal (which are collected at regular intervals over a measurement period t). Given that the FCB model for y (i.e. Equation 11) is a function of $\theta$, h, X, and $\upsilon$, and assuming that the noise has a covariance matrix $C_\upsilon$, the likelihood of that the measured signal comprises an FCB given the measurement y has been obtained can be expressed as:

$$p(y|\hat{\theta}, \hat{h}, \hat{C}_\upsilon, x) \quad \text{Eqn. 12}$$

where p(•) denotes an assumed probability density function for the FCB model, and $\hat{\theta}, \hat{h}, \hat{C}_\upsilon$, and X are the parameters of the FCB model, which will, in general, be unknown and are therefore estimated. Here, $\hat{\theta}$ is the estimated combined rotation of the measured signal due to the GMSK modulator and any phase offset, $\hat{h}$ is the estimated channel vector, $\hat{C}_\upsilon$ is the estimated covariance matrix of the assumed additive zero-mean Gaussian noise, and X is as defined above in Equation 10.

By maximizing Equation 12 with respect to the unknown parameters, the maximum likelihood that the measured signal y comprises an FCB can be found. This maximal value can, in one embodiment, be used as the likelihood $L_{FCB}$. In other words, in one embodiment, the likelihood $L_{FCB}$ may be defined as:

$$L_{FCB} = \arg\max_{\{\hat{\theta}, \hat{h}, \hat{C}_\upsilon\}} p(y | \hat{\theta}, \hat{h}, \hat{C}_\upsilon, X) \quad \text{Eqn. 13}$$

In one embodiment, the noise term $\upsilon$ is modelled as Additive White Gaussian Noise (AWGN). In other words, it is assumed that $\upsilon \sim \mathcal{CN}(0_{M \times 1}, \sigma^2 I_{M \times M})$, which is to say that the noise has a complex-valued Gaussian distribution, with a mean value of zero, and a covariance matrix of $\sigma^2 I_{M \times M}$ (where $I_{M \times M}$ is the identity matrix and $\sigma^2$ is the unknown complex-valued noise variance). It follows from this assumption that $L_{FCB}$ can, in this case, be expressed as:

$$\begin{aligned} L_{FCB} &= \arg\max_{\{\hat{\theta}, \hat{h}, \hat{\sigma}^2\}} p(y | \hat{\theta}, \hat{h}, \hat{\sigma}^2, X) \quad \text{Eqn. 14}\\ &= \arg\max_{\{\hat{\theta}, \hat{h}, \hat{\sigma}^2\}} \frac{1}{(\pi \hat{\sigma}^2)^{N \cdot n}} e^{-\frac{1}{\hat{\sigma}^2}\|y - F_M(\hat{\theta})X\hat{h}\|^2} \end{aligned}$$

Considering first the maximisation over the channel vector $\hat{h}$; since the maximum likelihood estimate of $\hat{h}$, and hence $\tilde{h}_i$, is independent of the noise variance, it is well known that the derivative of Eqn. 14 with respect to $\tilde{h}_i$ is zero (and therefore Eqn. 14 is maximised) when $\tilde{h}_i$ is:

$$\tilde{h}_{i,max} = \left(f_i(\hat{\theta})^H f_i(\hat{\theta})\right)^{-1} f_i(\hat{\theta})^H y_i = \frac{1}{N} f_i(\hat{\theta})^H y_i, \quad \text{Eqn. 15}$$

where $y_i$ is a set of measurements of a received signal, as measured within a measurement period t for a given receive dimension. For example, where the receiver 100 oversamples by a factor of two, $y_1$ would be a vector comprising the first, third, fifth ... etc. samples of the received signal, and $y_2$ would be a vector comprising the second, fourth, sixth ... etc. samples of the received signal. As another example, where the receiver 100 samples a received signal at the same rate at which the transmitter 50 transmits the FCB data bits, but receives signals from the transmitter 50 on two antennas, $y_1$ would be a vector comprising samples obtained via one antenna, and $y_2$ would be a vector comprising samples obtained via the other antenna. In Eqn. 15, $(\cdot)^H$ represents the Hermitian conjugate and the result $f_i(\hat{\theta})^H f_i(\hat{\theta})=N$ has been used to simplify the expression. Inserting Eqn. 15 into Eqn. 14 gives:

$$L_{FCB} = \underset{\{\hat{\theta},\hat{\sigma}^2\}}{\arg\max} \frac{1}{(\pi\hat{\sigma}^2)^{N\cdot n}} e^{-\frac{1}{\hat{\sigma}^2}\left(\sum_{i=1}^{n}\left\|y_i - \frac{1}{N}f_i(\hat{\theta})f_i(\hat{\theta})^H y_i\right\|^2\right)} \quad \text{Eqn. 16}$$

$$= \underset{\{\hat{\theta},\hat{\sigma}^2\}}{\arg\max} \frac{1}{(\pi\hat{\sigma}^2)^{N\cdot n}} e^{-\frac{1}{\hat{\sigma}^2}\left(\sum_{i=1}^{n} y_i^H y_i - \frac{1}{N}y_i^H f_i(\hat{\theta})f_i(\hat{\theta})^H y_i\right)}$$

Considering the maximisation of Equation 16 with respect to $\sigma^2$, it is a well-known result that when noise is AWGN the optimal value of $\hat{\sigma}^2$ is the normalized sum of the squared residuals i.e.

$$\frac{1}{N\cdot n}\sum_{i=1}^{n} y_i^H y_i - \frac{1}{N}y_i^H f_i(\hat{\theta})f_i(\hat{\theta})^H y_i.$$

Thus, maximising over $\hat{\sigma}^2$ gives:

$$L_{FCB} = \underset{\hat{\theta}}{\arg\max} \frac{1}{\left(\pi\hat{\sigma}_{ML,FCB}(\hat{\theta})^2\right)^{N\cdot n}} e^{-N\cdot n} \quad \text{Eqn. 17}$$

where $$\hat{\sigma}_{ML,FCB}(\hat{\theta})^2 \triangleq \frac{1}{N\cdot n}\left(\sum_{i=1}^{n} y_i^H y_i - \frac{1}{N}y_i^H f_i(\hat{\theta})f_i(\hat{\theta})^H y_i\right)$$

represents the maximisation with respect to $\hat{\sigma}^2$.

In one embodiment of the present invention Eqn. 17 is used to calculate the LRV for a given measured signal y.

Having found a simplified expression for $L_{FCB}$ the next thing to consider is the embodiment, $L_{noFCB}$ is found using maximum likelihood hypothesis testing by maximising an expression for the likelihood that the measured signal does not comprise an FCB, given that the measurement y has been obtained. In one embodiment, this likelihood is based on the model that a signal that does not comprise an FCB is pure noise. In such an arrangement, $L_{noFCB}$ can be expressed as the maximum value of the likelihood that the measured signal is pure noise, given that the measurement y has been obtained. Again, assuming that the noise is AWGN, the likelihood that the measured signal is pure noise, given that the measurement y has been obtained can be expressed as:

$$p(y\mid \hat{\sigma}^2) = \frac{1}{(\pi\hat{\sigma}^2)^{N\cdot n}} e^{-\frac{1}{\hat{\sigma}^2} y^H y} \quad \text{Eqn. 18}$$

In one embodiment, $L_{noFCB}$ is calculated as the maximal value of Equation 18 with respect to $\hat{\sigma}^2$. Again, using the result that the maximal value of Equation 18 is obtained when $\hat{\sigma}^2$ is the normalized sum of the squared residuals, i.e. $1/N\cdot n\, y^H y$, leads to the expression:

$$L_{noFCB} = \frac{1}{(\pi\hat{\sigma}_{AWGN}^2)^{N\cdot n}} e^{-N\cdot n} \quad \text{Eqn. 19}$$

where $$\hat{\sigma}_{AWGN}^2 \triangleq \frac{1}{N\cdot n} y^H y.$$

Thus, an expression for $L_{FCB}/L_{noFCB}$ can be written as:

$$\frac{L_{FCB}}{L_{noFCB}} = \underset{\hat{\theta}}{\max}\left(\frac{\hat{\sigma}_{FCB}(\hat{\theta})^2}{\hat{\sigma}_{AWGN}^2}\right)^{-N\cdot n} \quad \text{Eqn. 20}$$

In one embodiment, the LR calculator 130 may be preconfigured with the expression given in Eqn. 20. In this embodiment, the LR calculator 130 may be configured to receive samples of a received signal y (which have been obtained over a measurement period t) from the signal measurement components 120, and input those samples into Eqn. 20. The LR calculator 130 may then be configured to maximise Eqn. 20 whereby to determine an LRV for the measured signal y.

In an alternative embodiment, the LR calculator 130 may be preconfigured with an alternative expression, which nevertheless is indicative of the ratio $L_{FCB}/L_{noFCB}$. This may be useful if an alternative expression is simpler to maximise or is more numerically stable (this could e.g. be in terms of the number or complexity of mathematical operations that need to be performed by the LR calculator 130 for example). Such an expression may be, for example:

$$LRV = \underset{\hat{\theta}}{\max}\ln\left(\frac{\hat{\sigma}_{FCB}(\hat{\theta})^2}{\hat{\sigma}_{AWGN}^2}\right)^{-N\cdot n} \quad \text{Eqn. 21}$$

$$= \underset{\hat{\theta}}{\max} -N\cdot n\ln\left(\frac{\hat{\sigma}_{FCB}(\hat{\theta})^2}{\hat{\sigma}_{AWGN}^2}\right)$$

$$= -N\cdot n\ln\left(\frac{\underset{\hat{\theta}}{\min}\sum_{i=1}^{n} y_i^H y_i - \frac{1}{N}y_i^H f_i(\hat{\theta})f_i(\hat{\theta})^H y_i}{\sum_{i=1}^{n} y_i^H y_i}\right)$$

$$= -N\cdot n\ln\left(1 - \frac{\underset{\hat{\theta}}{\max}\frac{1}{N}\sum_{i=1}^{n} y_i^H y_i - \frac{1}{N}y_i^H f_i(\hat{\theta})f_i(\hat{\theta})^H y_i}{y^H y}\right)$$

It will be appreciated that, because the logarithm is a monotonically increasing function, Eqn. 21 gives an expression which is indicative of $L_{FCB}/L_{noFCB}$ and is therefore indicative of the likelihood that a measured signal y comprises an FCB. Irrespective of whether Eqn. 20 or Eqn. 21 is used to calculate the LRV, it will be appreciated that the higher the LRV, the more likely it is that a measured signal y comprises an FCB. Thus, in one embodiment, the calculated LRV may be compared to a threshold value, and if the LRV is greater than the threshold value, it may be determined that the measured signal y comprises a frequency correction burst. In one embodiment the threshold value may depend on n and N. Alternatively, the threshold value could be a fixed value. Where Equation 21 is used to calculate the LRV, and when n=2 and N=142, a threshold value of 75 has been found to give good FCB detection rates across a range of SNRs.

As mentioned above, the LR calculator 130 may be configured to maximise one of the expressions given in Equations 20 or 21, or, equivalently, the expression $L_{FCB}$ with respect to $\hat{\theta}$. This maximisation can be performed using any exact or approximate optimisation method. As will be appreciated, many such optimisation methods will involve the step of finding (either an exact or approximate) value of $\hat{\theta}$ that makes the expression that is being maximised maximal (hereinafter referred to as $\hat{\theta}_{max}$). There are many techniques for finding such a value of $\hat{\theta}_{max}$.

As one example, the value of $\hat{\theta}_{max}$ can be found using differentiation. As another example a "brute force" technique can be used, in which values of $\hat{\theta}$ are trialed in an iterative fashion, until the value of $\hat{\theta}$ which gives the largest value for the expression being maximized is found.

In one specific embodiment, $\hat{\theta}_{max}$ is estimated by estimating the frequency of the measured signal y, and using this frequency estimate to derive $\hat{\theta}_{max}$. This can be done, for example by modelling the noise in the received signal as white noise, identifying the noise subspace for the received signal, and removing the noise components from the received signal. The frequency of the received signal with the noise components removed can then be determined, and this can be used to find an estimate for $\hat{\theta}_{max}$. The estimate for $\hat{\theta}_m$ can in turn be substituted into the expression for the LRV. An example of such a frequency estimation method is given in the paper "*Low-complexity Frequency Synchronization for GSM Systems: Algorithms and Implementation*" by Harald Kroll, Stefan Zwicky, Christian Benkeser, Qiuting Huang and Andreas Burg, as published in "*IV International Congress on Ultra Modern Telecommunications and Control Systems 2012*", pages 168 to 173.

By using either of Equations 20 or 21 (or another equivalent equation) to calculate an LRV, FCBs can be detected quickly and reliably. This is because $L_{FCB}$ is based on a model that takes into account both the frequency offset between the local oscillators of the transmitter 50 and the receiver 100, and the noise in the received signal. Thus, the model is accurate even for large frequency offsets and low SNR levels (i.e. low input power levels).

Figure 6:
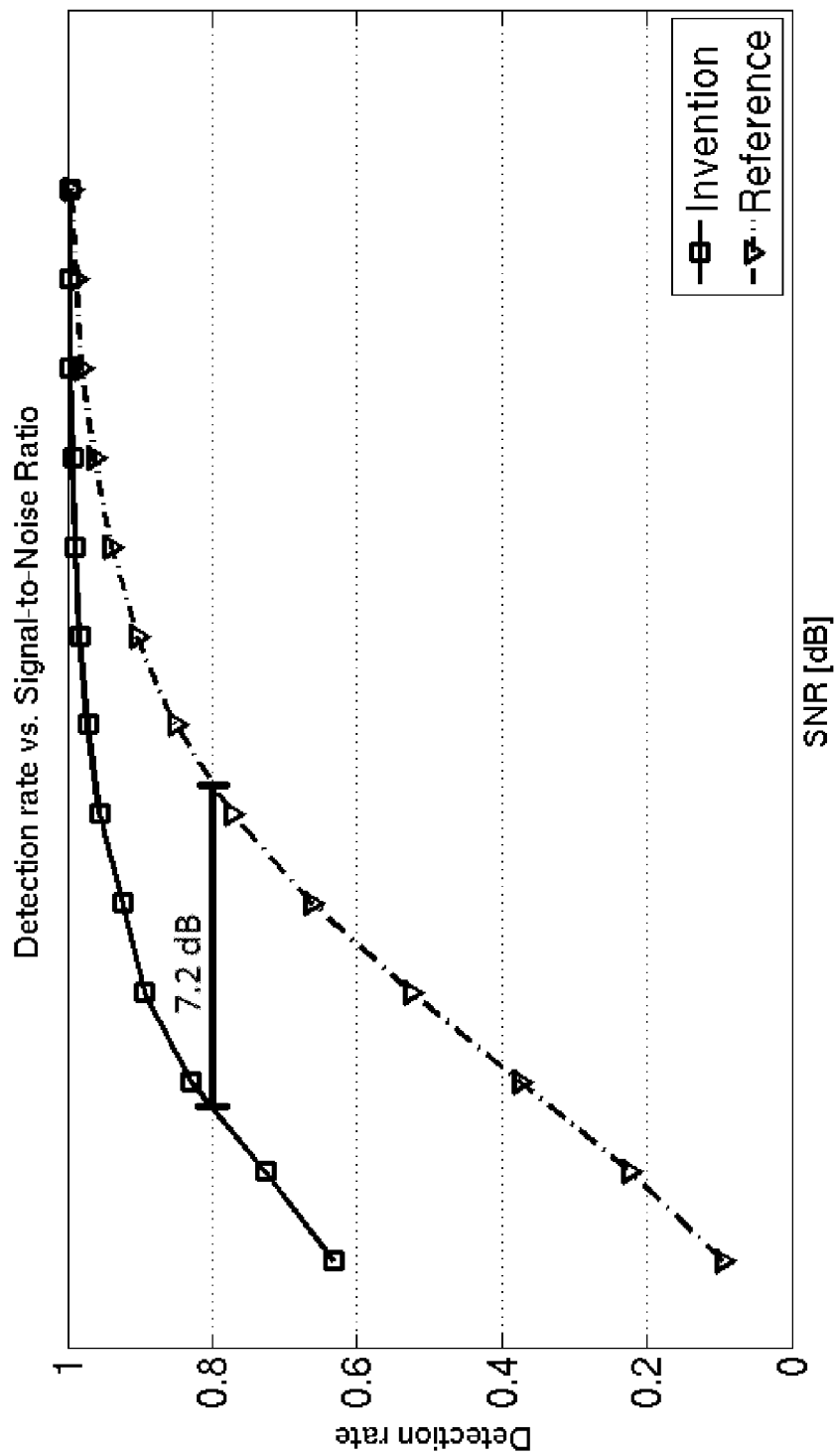
FIG. 6 shows schematically a graph of FCB detection rate against Signal-to-Noise Ratio (SNR) achieved using an embodiment of the present invention, as compared to the FCB detection rate of a standard prior art FCB detection technique; and, FIG. 7 components of an exemplary receiver according to an embodiment of the present invention.

Indeed, FIG. 6 shows a graph of the FCB detection rate against the SNR level achieved using the above-described models, as compared to the FCB detection rate of a standard prior art FCB detection technique (in this Figure, the upper line shows the performance of the present invention, and the lower line shows the performance of the prior art FCB detection technique). It can be seen that the present invention performs better over all SNR levels, but in particular, at low SNR levels.

It will be appreciated that measurements of a received signal may be modified before they are used to calculate an LRV. To this end, it will be appreciated that various operations may be performed on a signal received within a particular measurement period before an LRV is calculated in respect of that measured signal. These processing operations may be performed by the signal measurement components 120, or other components of the receiver 100.

As an example, in one embodiment, where the model for the measured signal y as given in Eqn. 11 is used to calculate the LRV, a pre-whitening operation may be performed on a received signal, before any LRVs are calculated. This is advantageous when the noise in the received signal is not AWGN, because the pre-whitening operation will remove any correlation in the noise, thereby increasing the accuracy of the models for the measured signal y (because both models assume noise is AWGN).

As another example, a received signal may be DC-compensated before any LRVs are calculated for the signal. As an example, the DC components of a measured signal y can be calculated as:

$$y_{DC} = \frac{1}{N \cdot n} \sum_{i=1}^{N \cdot n} y_i \qquad \text{Eqn. 22}$$

where $y_i$ is the ith sample of the measured signal y. In this case, $y_{DC}$ would be subtracted from each of the components in vector y and, in one embodiment, the DC-compensated vector $y_{noDC}$ would be used to calculate the LRV for the measured signal y. A receiver 100 which is configured to perform such a DC-compensation is shown schematically in FIG. 7. The receiver comprises one or more components 120A configured to remove the DC components from a received signal. The component(s) 120A form part of the signal measurement components 120 shown schematically in FIG. 2.

Alternatively, or additionally, a de-rotation operation may be performed on a received signal to account for the rotation due to GMSK modulation at the transmitter 50 (i.e. the received signal may be rotated by an angle of $-\phi$). It will be appreciated that, in this case, the FCB model for the signal y would not need to take this rotation into account, and the expression for the LRV would, for example, be dependent on $\psi$, rather than $\theta$. The receiver 100 shown in FIG. 7 also comprises one or more components 120B for performing this de-rotation operation. Again, the component(s) 120B form part of the signal measurement components 120 shown schematically in FIG. 2.

Alternatively or additionally, the received signal may be low-pass filtered or band-pass filtered before any LRVs are calculated. The receiver 100 shown in FIG. 7 comprises one or more components 120C for performing this de-rotation operation. The component(s) 120C form part of the signal measurement components 120 shown schematically in FIG. 2.

Figure 7:
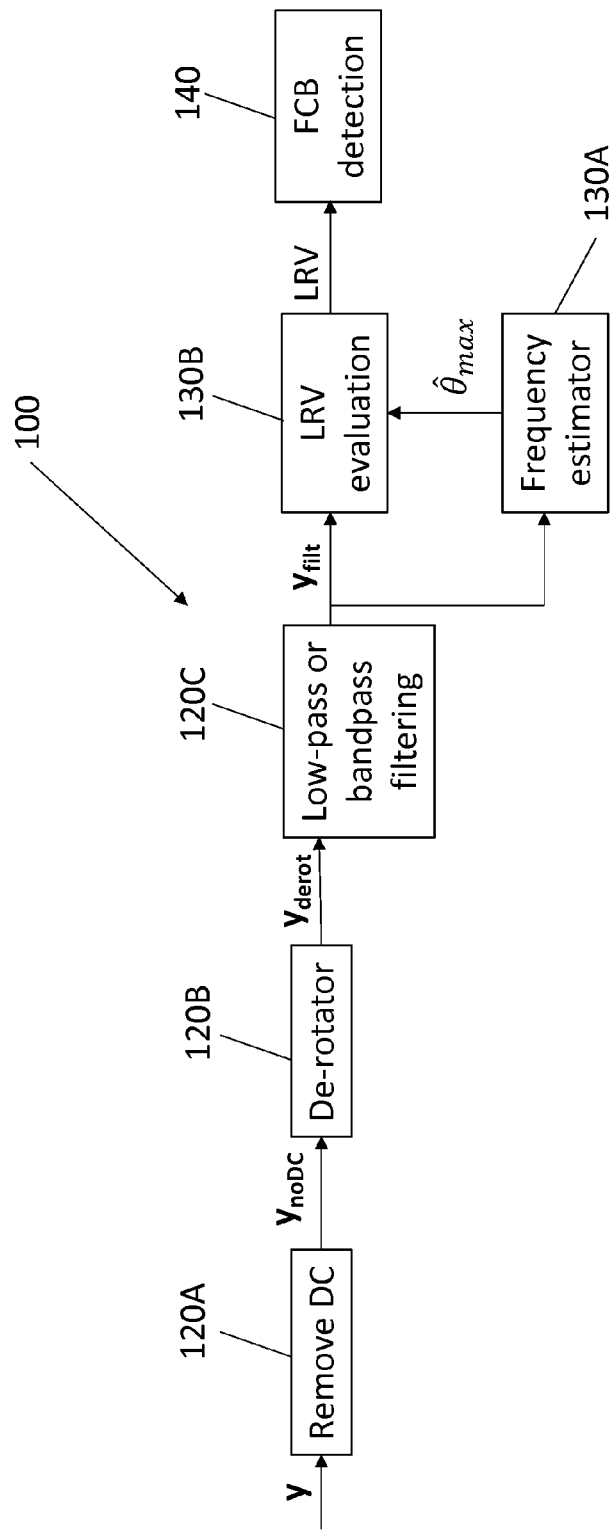

The particular receiver arrangement shown in FIG. 7 also comprises one or more frequency estimation components 130A, and one or more LRV evaluation components 130B. These components are components of the more general LR calculator 130 illustrated schematically in FIG. 2. In one embodiment, the frequency estimation component(s) 130A may be configured to receive samples of a (modified) received signal from the signal measurement components (120A, 120B, 120C) and estimate the frequency of that (modified) signal. From this, an estimate of $\hat{\theta}_{max}$ may be determined. The LRV evaluation component(s) 130B may be configured to receive both samples of the (modified) received signal the signal measurement components (120A, 120B, 120C), and an estimate of $\hat{\theta}_{max}$ from the frequency estimation component(s) 130A. The LRV evaluation component(s) 130B may then be configured to input these values into an expression for the LRV (such as the expressions given in Equations 20 and 21), whereby to output an LRV for use by the FCB detector 140 as described above.

As mentioned above, each of the components of the receiver 100 may be provided by one or more processors or processing systems. It will be understood any such processors or processing systems may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Further, although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Whilst the present invention has been described in terms of its usefulness in determining whether a frequency correction burst has been received by a receiver, it will be appreciated that the present invention has wider applicability and can be used to determine whether other types of signal components have been received by a receiver.

In particular, the models described above can be used to describe any signal component which is a pure tone (i.e. has a constant frequency). Thus, the above-described models can be used for determining whether any pure-tone signal component has been received by a receiver.

In other words, the above-described methods can be used to calculate a likelihood ratio value indicative of the ratio of a likelihood $L_{FSC}$ that the measured signal comprises a first signal component (FSC) which is a pure tone signal component, and a likelihood $L_{noFSC}$ that the measured signal does not comprise a first signal component which is a pure tone signal component. The likelihood ratio value would be determined using maximum likelihood hypothesis testing as described above, and could, for example, be based on both on a model for a signal that does comprise a pure tone signal component, and a model for a signal that does not comprise the pure tone signal component.

In one embodiment, $L_{FSC}$ may be expressed according to Equation 17 above, and $L_{noFSC}$ may be expressed according to Equation 19 above (with "FCB" in effect being replaced by "FSC" in these equations).

Where a signal is received from a transmitter that is known to transmit first signal components in bursts, it will be appreciated that the above-described methods may also be used to determine the approximate time at which a first signal component is received.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus for a receiver, the apparatus being for determining whether a signal received by a receiver comprises a pure tone signal component, and the apparatus comprising:
   at least one processor;
   and at least one memory including computer program code;
   the at least one memory and the computer program code being configured to, with the at least one processor, to cause the apparatus at least to perform:
   measuring a received signal over a measurement period;
   calculating, using maximum likelihood hypothesis testing, a likelihood ratio value for the measured signal, said likelihood ratio value being indicative of the ratio of a likelihood $L_{FSC}$ that the measured signal comprises a pure tone signal component, and a likelihood $L_{noFSC}$ that the measured signal does not comprise the pure tone signal component; and,
   determining, based on said likelihood ratio value, whether the measured signal comprises the pure tone signal component.

2. The apparatus according to claim 1, wherein said pure tone signal component is an encoded burst of data bits and substantially all the data bits have the same value, and the at least one memory and the computer program code are configured, with the at least one processor, to cause the apparatus to determine whether the measured signal comprises a said encoded burst of data bits.

3. The apparatus according to claim 1, wherein the pure tone signal component is a frequency correction burst and the at least one memory and the computer program code are configured, with the at least one processor, to cause the apparatus to determine whether the measured signal comprises a frequency correction burst.

4. The apparatus according to claim 1, wherein the at least one memory and the computer program code are configured, with the at least one processor, to cause the apparatus to compare the likelihood ratio value to a threshold value whereby to determine whether the measured signal comprises the pure tone signal component.

5. The apparatus according to claim 1, wherein the at least one memory and the computer program code are configured, with the at least one processor, to cause the apparatus to repeat said steps of calculating a likelihood ratio and determining whether the measured signal comprises a pure tone signal component over a plurality of measurement periods.

6. The apparatus according to claim 5, wherein said received signal is received from a transmitter which is known to transmit pure tone signal components in bursts at regular time intervals, and in which, said plurality of measurement periods together span at least the time interval between two successively transmitted pure tone signal component bursts.

7. The apparatus according to claim 6, wherein said plurality of measurement periods overlap in the time domain, and in which, the at least one memory and the computer program code are configured, with the at least one processor, to cause the apparatus to determine whether a measured signal comprises a pure tone signal component by:
   comparing the calculated likelihood ratio value for each measured signal to a threshold value;
   identifying any measured signals for which the likelihood ratio value is above the threshold value; and comparing the likelihood ratio values for any identified measured signals whereby to establish in which measurement period a pure tone signal component burst was most likely received.

8. The apparatus according to claim 1, wherein the likelihood ratio value is determined based on a model for a received signal comprising a pure tone signal component, and a model for a received signal that does not comprise the pure tone signal component.

9. The apparatus according to claim 8, wherein said model for a received signal comprising a pure tone signal component is based on a model for an encoded burst of data bits, and wherein substantially all of said data bits have the same value.

10. The apparatus according to claim 8, wherein said model for a received signal comprising a pure tone signal component is dependent on the frequency offset between the transmitter that transmitted the received signal and said receiver.

11. The apparatus according to claim 10, wherein the at least one memory and the computer program code are configured, with the at least one processor, to cause the apparatus to estimate the frequency offset between the transmitter that transmitted the received signal and the receiver which will give the maximum value of $L_{FSC}$, whereby to calculate the likelihood ratio value.

12. The apparatus according to claim 8, wherein said model for a signal comprising a pure tone signal component includes a model for the likely noise in the signal.

13. The apparatus according to claim 12, wherein the noise is modelled as Additive White Gaussian Noise.

14. The apparatus according to claim 13, wherein the at least one memory and the computer program code are configured, with the at least one processor, to cause the apparatus to apply a pre-whitening operation to the measured signal before calculating the likelihood ratio value for the pre-whitened measured signal.

15. The apparatus according to claim 1, wherein said likelihood ratio value is: $L_{FSC}/L_{noFSC}$, or the logarithm of $L_{FSC}/L_{noFSC}$.

16. The apparatus according to claim 15, wherein the receiver has a receive dimension of n and said received signal is received from a transmitter that is known to transmit pure tone signal components comprising N encoded data bits, and wherein the at least one memory and the computer program code are configured, with the at least one processor, to cause the apparatus to calculate the likelihood ratio value according to either:

$$\max_{\theta}\left(\frac{\hat{\sigma}_{ML,FSC}(\hat{\theta})^2}{\hat{\sigma}_{AWGN}^2}\right)^{-N \cdot n} \text{ or } \max_{\theta} \ln\left(\frac{\hat{\sigma}_{ML,FSC}(\hat{\theta})^2}{\hat{\sigma}_{AWGN}^2}\right)^{-N \cdot n}$$

wherein $$\hat{\sigma}_{ML,FSC}(\hat{\theta})^2 \triangleq \frac{1}{N \cdot n}\left(\sum_{i=1}^{n} y_i^H y_i - \frac{1}{N} y_i^H f_i(\hat{\theta}) f_i(\hat{\theta})^H y_i\right),$$

and $$\hat{\sigma}_{AWGN}^2 \triangleq \frac{1}{N \cdot n} y^H y,$$

and wherein:

y is a vector comprising measurements of the received signal obtained over the measurement period;

$$f_i(\theta) \triangleq [e^{j\rho_i}, e^{j(\theta+\rho_i)}, e^{j(2\theta+\rho_i)}, \ldots, e^{j((N-1)\theta+\rho_i)}]^T;$$

$p_i$ is a parameter which accounts for any phase offset between receive dimensions of the receiver;

θ is a parameter which accounts for any phase rotation of the measured signal caused by modulation of the signal at the transmitter and any frequency offset between the transmitter and the receiver;

$\hat{\theta}$ is the estimated value of θ; and, $$j \triangleq \sqrt[2]{-1}.$$

17. The apparatus according to claim 1, wherein said received signal is received from a transmitter which is known to transmit pure tone signal components which are modulated using Gaussian Minimum Shift Keying modulation before transmission, and wherein the at least one memory and the computer program code are configured, with the at least one processor, to cause the apparatus to perform a phase rotation operation on said measured signal, prior to calculating the likelihood ratio value for the measured signal, whereby to remove any phase rotation caused by the Gaussian Minimum Shift Keying modulation.

18. The apparatus according to claim 1, wherein the apparatus is for use in a GSM network.

19. A method of determining at a receiver whether a received signal comprises a pure tone signal component, the method comprising:
    measuring a received signal over a measurement period;
    calculating, using maximum likelihood hypothesis testing, a likelihood ratio value for the measured signal, said likelihood ratio value being indicative of the ratio of a likelihood $L_{FSC}$ that the measured signal comprises a pure tone signal component, and a likelihood $L_{noFSC}$ that the measured signal does not comprise the pure tone signal component; and,
    determining, based on said likelihood ratio value, whether the measured signal comprises the pure tone signal component.

20. A non-transitory computer-readable storage medium comprising a set of computer-readable instructions stored thereon for determining whether a signal received by a receiver comprises a pure tone signal component, the set of computer-readable instructions being such that, when executed by a processing system, the processing system is caused to:
    measure a received signal over a measurement period;
    calculate, using maximum likelihood hypothesis testing, a likelihood ratio value for the measured signal, said likelihood ratio value being indicative of the ratio of a likelihood $L_{FSC}$ that the measured signal comprises a pure tone signal component, and a likelihood $L_{noFSC}$ that the measured signal does not comprise the pure tone signal component; and,
    determine, based on said likelihood ratio value, whether the measured signal comprises the pure tone signal component.

* * * * *